United States Patent
Urata (12) 
(10) Patent No.: US 10,515,664 B2
(45) Date of Patent: Dec. 24, 2019

(54) MAGNETIC DISK DEVICE CAPABLE OF REALLOCATING ADDRESS CORRESPONDING TO DEFECTIVE SECTOR TO ALTERNATIVE SECTOR

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yukio Urata, Sagamihara Kanagawa (JP)

(73) Assignees: KABUSHIKI KAISHA TOSHIBA, Tokyo (JP); TOSHIBA ELECTRONICS DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/120,291

(22) Filed: Sep. 2, 2018

(65) Prior Publication Data

US 2019/0295596 A1   Sep. 26, 2019

(30) Foreign Application Priority Data

Mar. 20, 2018 (JP) .................. 2018-052915

(51) Int. Cl.
 *G11B 20/18* (2006.01)
 *G11B 27/36* (2006.01)
 *G11B 19/04* (2006.01)

(52) U.S. Cl.
 CPC .......... *G11B 20/1889* (2013.01); *G11B 27/36* (2013.01); *G11B 19/041* (2013.01); *G11B 2020/1893* (2013.01); *G11B 2220/20* (2013.01)

(58) Field of Classification Search
 None
 See application file for complete search history.

(56) References Cited

U.S. PATENT DOCUMENTS

| | | | |
|---|---|---|---|
| 5,917,724 A | 6/1999 | Brousseau et al. | |
| 6,246,537 B1 * | 6/2001 | Shirane | G11B 20/1217 360/78.08 |
| 10,199,067 B1 * | 2/2019 | Gan | G11B 23/507 |
| 2004/0236985 A1 | 11/2004 | Durica et al. | |
| 2013/0064060 A1 * | 3/2013 | Oberg | G11B 7/0948 369/53.15 |
| 2017/0062003 A1 * | 3/2017 | Amano | G11B 20/1816 |
| 2018/0174615 A1 * | 6/2018 | Kawai | G11B 20/1816 |

FOREIGN PATENT DOCUMENTS

JP   2004-030852 A   1/2004

* cited by examiner

*Primary Examiner* — Tan X Dinh
(74) *Attorney, Agent, or Firm* — Kim & Stewart LLP (57) ABSTRACT

According to one embodiment, a magnetic disk device includes a disk that includes a plurality of tracks, each track including a plurality of sectors for storing data, a head that is for writing data to the plurality of sectors and reading data from the plurality of sectors, and a controller. The controller is configured to determine that a first sector of the plurality of sectors is not able to be read and is a defective sector, determine that a second sector of the plurality of sectors is disposed along a line that extends through the first sector and a defective sector included in a first list of defective sectors, register the second sector in the first list of defective sectors, and reallocate an address corresponding to the second sector to a first alternative sector included on the disk.

20 Claims, 7 Drawing Sheets

MAGNETIC DISK DEVICE CAPABLE OF REALLOCATING ADDRESS CORRESPONDING TO DEFECTIVE SECTOR TO ALTERNATIVE SECTOR

CROSS-REFERENCE TO RELATED APPLICATIONS

This application is based upon and claims the benefit of priority from. Japanese Patent Application No. 2018-052915, filed Mar. 20, 2018, the entire contents of which are incorporated herein by reference.

FIELD

Embodiments described herein relate generally to a magnetic disk device and read processing method.

BACKGROUND

A magnetic disk device includes a P list (primary list) in which a sector (hereinafter, referred to as a defective sector) containing a defect, such as a scratch detected in an inspection before shipment, is registered and a G list (grown list) in which the defective sector detected after shipment is registered. Usually, the sector containing a minor defect, such as a thin scratch that could be written and read without any problem before shipment, may not be registered in the P List. The sector including such a minor defect may be located in the vicinity of the defective sector, or the like, and registered in the P list. For that reason, when a defective sector is detected in the vicinity of the defective sector registered in the P list after shipment, a sector located in the vicinity of the defective sector registered in the P list and the defective sector detected after shipment may become a defective sector due to age-related deterioration, growth of scratches of the defective sectors registered in the surrounding P list or G list, and the like.

DETAILED DESCRIPTION

Embodiments provide a magnetic disk device and a read processing method capable of preventing deterioration in read performance.

In general, according to one embodiment, a magnetic disk device includes a disk that includes a plurality of tracks, each track including a plurality of sectors for storing data, a head that is for writing data to the plurality of sectors and reading data from the plurality of sectors, and a controller. The controller is configured to determine that a first sector of the plurality of sectors is not able to be read and is a defective sector, determine that a second sector of the plurality of sectors is disposed along a line that extends through the first sector and a defective sector included in a first list of defective sectors, register the second sector in the first list of defective sectors, and reallocate an address corresponding to the second sector to a first alternative sector included on the disk.

Hereinafter, embodiments will be described with reference to the accompanying drawings. The drawings are merely examples and do not limit the scope of the exemplary embodiment.

Embodiment

Figure 1:
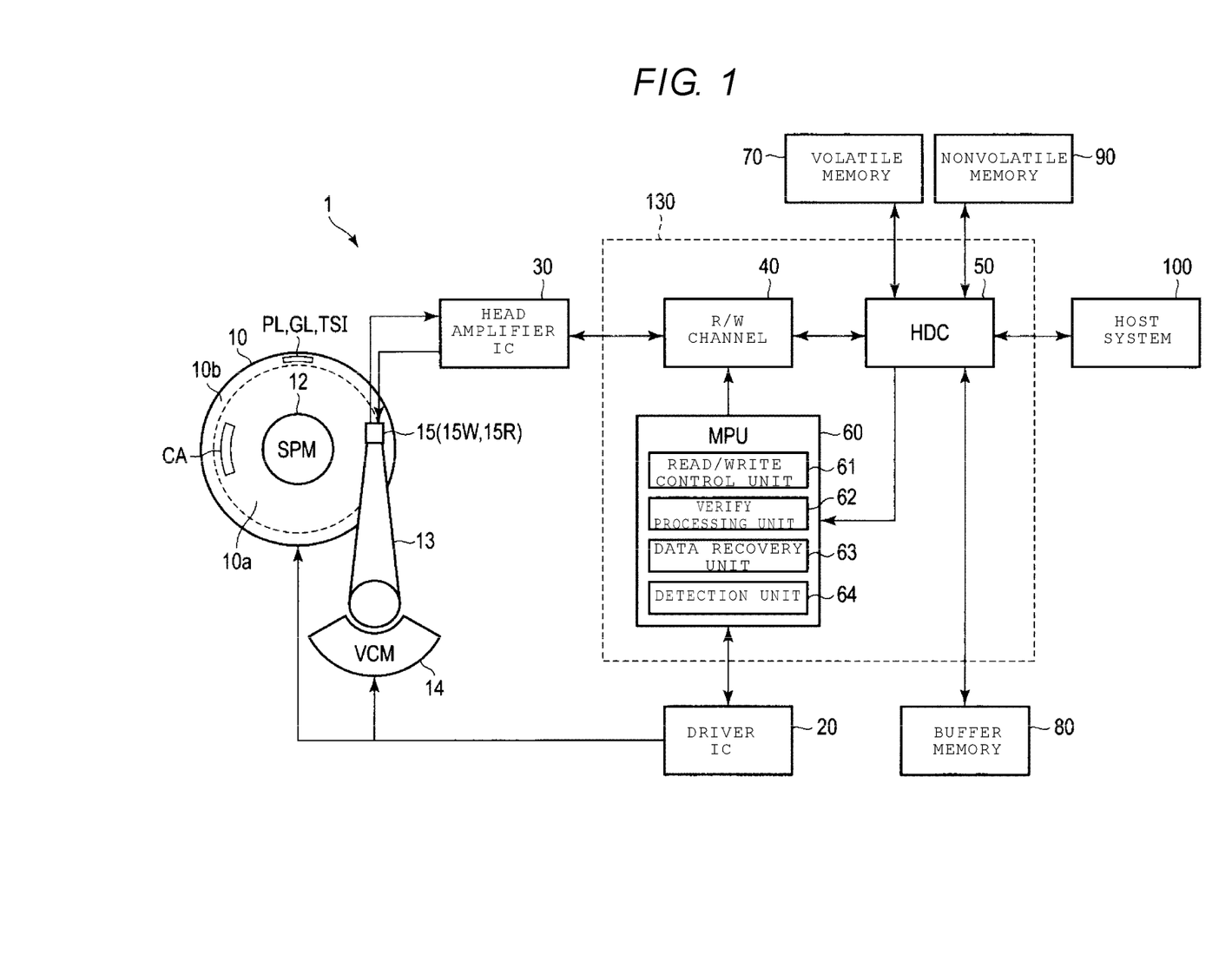
FIG. 1 is a block diagram illustrating a configuration of a magnetic disk device according to an embodiment.

FIG. 1 is a block diagram illustrating a configuration of a magnetic disk device 1 according to an embodiment.

The magnetic disk device 1 includes a head disk assembly (HDA), a driver IC 20, a head amplifier integrated circuit (hereinafter, referred to as a head amplifier IC or preamplifier) 30, a volatile memory 70, a buffer memory (buffer) 80, a nonvolatile memory 90, and a system controller 130 which is an integrated circuit of one chip, which will be described later. Further, the magnetic disk device 1 is connected to a host system (hereinafter, simply referred to as a host) 100.

The HDA includes a magnetic disk (hereinafter, referred to as a disk) 10, a spindle motor (hereinafter, referred to as an SPM) 12, an arm 13 on which a head 15 is mounted, and a voice coil motor (hereinafter, referred to as a VCM) 14. The disk 10 is attached to the spindle motor 12 and rotates by driving the spindle motor 12. The arm 13 and the VCM 14 constitute an actuator. The actuator controls movement of the head 15 mounted on the arm 13 to a target position on the disk 10 by driving the VCM 14. In some embodiments, the magnetic disk device 1 includes two or more of the disks 10 and the heads.

In the disk 10, an area where data can be written includes a user data area 10a that can be used by a user and a system area 10b for writing information necessary for system management. Hereinafter, a direction orthogonal to a radial direction of the disk 10 is referred to as a circumferential direction. A term "Access" is used to refer to "writing data to disk 10" and "reading data from disk 10" collectively or individually. The user data area 10a includes an alternative area CA. Alternatively or additionally, in some embodiments, the alternative area CA may be included in the system area 10b. The system area 10b includes a P list (primary list) PL, a G list (grown list) GL, and track slip information TSI. Alternatively or additionally, in some embodiments, the P list PL, the G list GL, and the track slip information TSI may be stored in the volatile memory 70, the nonvolatile memory 90, or the like, which will be described later. In one example, in the system area 10b, a capacity of a recording area for storing the P list PL is greater than the capacity of the recording area for storing the G list GL.

The P list PL includes information for managing or tracking a flawed sector (hereinafter, referred to as a "defective sector" or "initial defective sector") previously detected by inspection of flaws (or defects) such as scratches on the disk 10 before shipment of the magnetic disk device 1. The P list PL is generated based on an address map of a data structure of the disk 10, for example. A sector is, for example, a recording area of the smallest unit when data is written to the disk 10. In one example, one sector is a recording area of 512 bytes or 4 Kbytes of the disk 10. Hereinafter, the expression "reading data written in a sector" may be simply referred to as "reading a sector".

The G list GL includes information for managing a defective sector (hereinafter, also referred to as a later defective sector) detected by sector access after shipment of the magnetic disk device 1. Thus, the defective sectors included in the G list GL are sectors that have been determined to be readable and then subsequently have been determined to be unreadable or otherwise unusable, for example due to repeated read errors. For all defective sectors detected by sector access after shipment, the G list GL maps or otherwise indicates the correspondence between addresses, such as physical addresses of the defective sectors or logical block addresses (LBAs) associated with the physical addresses of the defective sectors, and alternative sectors used in place of these defective sectors. The alternative sectors are located in the alternative area CA. Hereinafter, for convenience of description, "address of a sector (LBA, physical address, and the like)" may be simply referred to as a "sector". In the G list GL, no information (addresses of later defective sectors and the like) on the later defective sectors (addresses of later defective sectors and the like) is registered before shipment. Instead, information related to a later defective sector is registered each time a later defective sector is detected after shipment. That is, the G list GL is updated with information associated with the later defective sectors when such sectors are detected as described below. The track slip information TSI includes information for managing a track having flaws (hereinafter, referred to as a defective track), such as an overall fluctuation detected by inspection of defects of the disk 10 before shipment of the magnetic disk device 1.

The head 15 includes a write head 15W and a read head 15R mounted on a slider as a main body. The write head 15W writes data onto the disk 10. The read head 15R reads data recorded in a data track on the disk 10.

A driver IC 20 controls driving of the SPM 12 and the VCM 14 according to control of a system controller 130 (more specifically, an MPU 60 described later).

A head amplifier IC (preamplifier) 30 includes a read amplifier and a write driver. The read amplifier amplifies a read signal read from the disk 10 and outputs the read signal to a system controller 130 (specifically, a read/write (R/W) channel 40 described later). The write driver outputs a write current in accordance with a signal output from the R/W channel 40 to the head 15.

A volatile memory 70 is a semiconductor memory in which stored data is lost when power supply is cut off. The volatile memory 70 stores data and the like necessary for processing in each component of the magnetic disk device 1. The volatile memory 70 can include, for example, a dynamic random access memory (DRAM), a static random access memory (SRAM), or a synchronous dynamic random access memory (SDRAM).

A buffer memory 80 is a semiconductor memory that temporarily records data and the like communicated between the magnetic disk device 1 and a host 100. The buffer memory 80 may be formed integrally with the volatile memory 70. The buffer memory 80 can include, for example, a DRAM, a SRAM, a SDRAM, a ferroelectric random access memory (FeRAM), a magnetoresistive random access memory (MRAM), or the like.

A nonvolatile memory 90 is a semiconductor memory used for storing data stored even when power supplied to magnetic disk device 1 is cut off. The nonvolatile memory 90 is, for example, a NOR type or NAND type flash ROM (FROM: Flash Read Only Memory).

The system controller 130 (controller) can be implemented as a large scale integrated circuit (LSI) called System-on-a-Chip (SoC) in which a plurality of elements are integrated on a single chip, for example. The system controller 130 includes a read/write (R/W) channel 40, a hard disk controller (HDC) 50, and a microprocessor (MPU) 60. The system controller 130 is communicatively connected to the driver IC 20, the head amplifier IC 30, the volatile memory 70, the buffer memory 80, the nonvolatile memory 90, the host system 100, and the like.

The R/W channel 40 executes signal processing on read data to be transferred from the disk 10 to the host 100 and write data transferred from the host 100 according to an instruction from the MPU 60 described later. The R/W channel 40 has a circuit or a function for measuring signal quality of read data. The R/W channel 40 is communicatively connected to the head amplifier IC 30, the HDC 50, the MPU 60, and the like, for example.

The HDC 50 controls data transfer between the host 100 and the R/W channel 40 according to an instruction from the MPU 60 to be described later. The HDC 50 is communicatively connected to, for example, the R/W channel 40, the MPU 60, the volatile memory 70, the buffer memory 80, the nonvolatile memory 90, and the like.

The MPU 60 is a main controller that controls each component of the magnetic disk device 1. The MPU 60 controls the VCM 14 via the driver IC 20 and executes servo control for positioning the head 15. The MPU 60 controls a write operation of data to the disk 10 and selects a save destination of write data. The MPU 60 controls a read operation of data from the disk 10 and controls processing of read data. The MPU 60 is connected to each component of the magnetic disk device 1. The MPU 60 is electrically connected to the driver IC 20, the R/W channel 40, the HDC 50, and the like, for example.

The MPU 60 includes a read/write control unit 61, a verify processing unit 62, a data recovery unit 63, and a detection unit 64. The MPU 60 executes the processes of these units, for example, the read/write control unit 61, the verify processing unit 62, the data recovery unit 63, the detection unit 64, and the like on firmware. The MPU 60 may include these units as circuits.

The read/write control unit 61 controls data read processing and data write processing according to a command from the host 100. The read/write control unit 61 controls the VCM 14 via the driver IC 20, positions the head 15 at a target position on the disk 10, and reads or writes data. For example, in a case where an instruction to read a defective sector registered in the G list GL (also referred to as a G sector) or an instruction to write data to the G sector by a command from the host 100 is received, the read/write control unit 61 reads an alternative sector corresponding to the instructed G sector or writes data to the alternative sector, based on the G list GL. When a read error occurs in a predetermined sector, the read/write control unit 61 executes a process (hereinafter, referred to as a retry process) of reading a sector in which the read error occurs again. When the read error occurs in the predetermined sector even if the retry process is performed a predetermined number of times (hereinafter, referred to as a retry threshold value), for example, several times to several hundred times or more, the read/write control unit 61 outputs a signal indicating that the read error will occur even if the sector is subjected to the retry process a number of times equal to or greater than the retry threshold value, for example, a signal indicating that the error is an unrecovered error, to the host 100.

The verify processing unit 62 reads data written in the predetermined sector of the disk 10 and executes a process of checking (or verifying) whether the data written in the sector can be read normally or not (hereinafter, referred to as a "verify process"). For example, in an instance where a read error occurs but the predetermined sector can be read with a number of times less than the retry threshold value, the verify processing unit 62 executes the verify process on the predetermined sector. In an instance in which data of the predetermined sector cannot be normally read, the verify processing unit 62 outputs a signal initiating a process (hereinafter, referred to as a rewrite process) of recovering the data of the sector and rewriting a track including the sector, for example, to a data recovery unit 63 (to be described later).

The data recovery unit 63 recovers the predetermined sector for which data cannot be normally read and executes the rewrite process on the track including the sector.

The detection unit 64 detects a defective sector and a determines that another sector or sectors are likely to subsequently become defective sectors. Hereinafter, such a sector that is determined to be likely to subsequently become a defective sector is referred to as an "extended defective sector"). An extended defective sector is a sector that is located in an extending direction from the detected defective sector. Generally, the extending direction is parallel with a line defined by one or more defective sectors registered in the P list PL and the detected defective sector that is not registered in the P list PL. That is, the extended defective sector(s) are disposed substantially along a line that extends from the one or more defective sectors registered in the P list PL and passes through the detected defective sector that is not registered in the P list PL (i.e., the target defective sector). For example, when the detection unit 64 detects a sector that cannot be read, even by being subjected to the retry process a number of times equal to or greater than the retry threshold value and/or by executing the rewrite process, the detection unit 64 determines that the detected sector is "target defective sector". When the target defective sector is detected, the detection unit 64 reads the P list PL, the track slip information TSI, and the like, and detects a sector (hereinafter referred to as an "extended defective sector") that may subsequently become a defective sector. The detection unit 64 makes the determination based on information included in the P list PL, the track slip information TSI, the physical location of the target defective sector, and the like. For example, based on the P list PL, the track slip information TSI, and/or the physical location of the target defective sector, the detection unit 64 detects a defective sector registered in the P list PL (hereinafter, referred to as a P sector) or an extended defective sector located between a defective track (hereinafter, referred to as a strip track) registered in the track slip information and a target defective sector. When the target defective sectors are consecutively aligned with the P sector or are in the slip track, the detection unit 64 determines that one or more sectors aligned consecutively with the target defective sector in the extending direction from the P sector are extended defective sectors. The detection unit make such a determination based on information included in the P list PL, the track slip information TSI, and the physical location of the target defective sector. In the following disclosure, when an extended defective sector is referred to as "being adjacent to" another sector, the extended defective sector may be "consecutively aligned with" or "directly located in contact with" the sector," either radially, circumferentially, or obliquely, as described below in conjunction with the figures.

The detection unit 64 registers or otherwise enters the target defective sector and the extended defective sector in the G list GL and the P list PL, respectively. That is, the detection unit 64 updates the G list GL with the target defective sector and the P list PL with the extended defective sector. In a case where the target defective sector is registered or otherwise entered in each of the G list GL and the P list PL, the detection unit 64 may register the defective sector so that the target defective sector has the same format in the G list GL and the P list PL. For example, in an instance in which the extended defective sector(s) are located between the P sector and the target defective sector, the detection unit 64 determines whether the number of the detected extended defective sectors is equal to or less than a threshold value (hereinafter, referred to as a registration threshold value) or greater than the registration threshold value. In some embodiments, the registration threshold is, for example, 1 to 2. Alternatively, in some embodiments, the registration threshold value may be, for example, a number greater than 2. When the detection unit 64 determines that the number of extended defective sectors is equal to or less than the registration threshold value, the detection unit 64 registers the target defective sector in the P list PL and the extended defective sector(s) in the G list GL. Accordingly, when the next target defective sector is detected in the vicinity of the target defective sector (hereinafter, referred to as a current target defective sector), the detection unit 64 can further determine whether the next target defective sector and the extended defective sector located in the vicinity of the current target defective sector (the P sector) are registered or not registered in the P list and the G list, respectively. When the detection unit 64 determines that the number of extended defective sectors is greater than the registration threshold value, the detection unit 64 does not register the extended defective sector in the P list PL or the G list GL, but registers the target defective sector in each of the P list PL and G list GL. When the target defective sector is adjacent to the P sector, the detection unit 64 registers the target defective sector and the one or more extended defective sectors in each of the P list PL and the G list GL, when 1) the number of extended defective sectors is equal to or less than the registration threshold value and 2) the one or more extended defective sectors are adjacent to the target defective sector in the extending direction of the target defective sector.

The detection unit 64 executes a process (hereinafter, referred to as a replacement process) of associating the G sector (for example, the address corresponding thereto) and P sector (for example, the address corresponding thereto) with an alternative sector. Thus, in one example, an LBA associated with the G sector is mapped, via the replacement process, to the physical address of the alternative sector. Hereinafter, the expression "to associate (or reallocate) an address corresponding to a predetermined sector with a predetermined alternative sector" is referred to as "replacement". For example, when the target defective sector is registered in the P list PL, the detection unit 64 replaces the target defective sector in the P list PL with the alternative sector. Similarly, in another example, when the extended defective sector is registered in the G list GL, the detection unit 64 replaces the extended defective sector in the G list GL with the alternative sector. Further, when the target defective sector is registered in each of the P list PL and the G list GL, the detection unit 64 replaces the target defective sector registered in the P list PL and the G list GL with the alternative sector.

Figure 2:
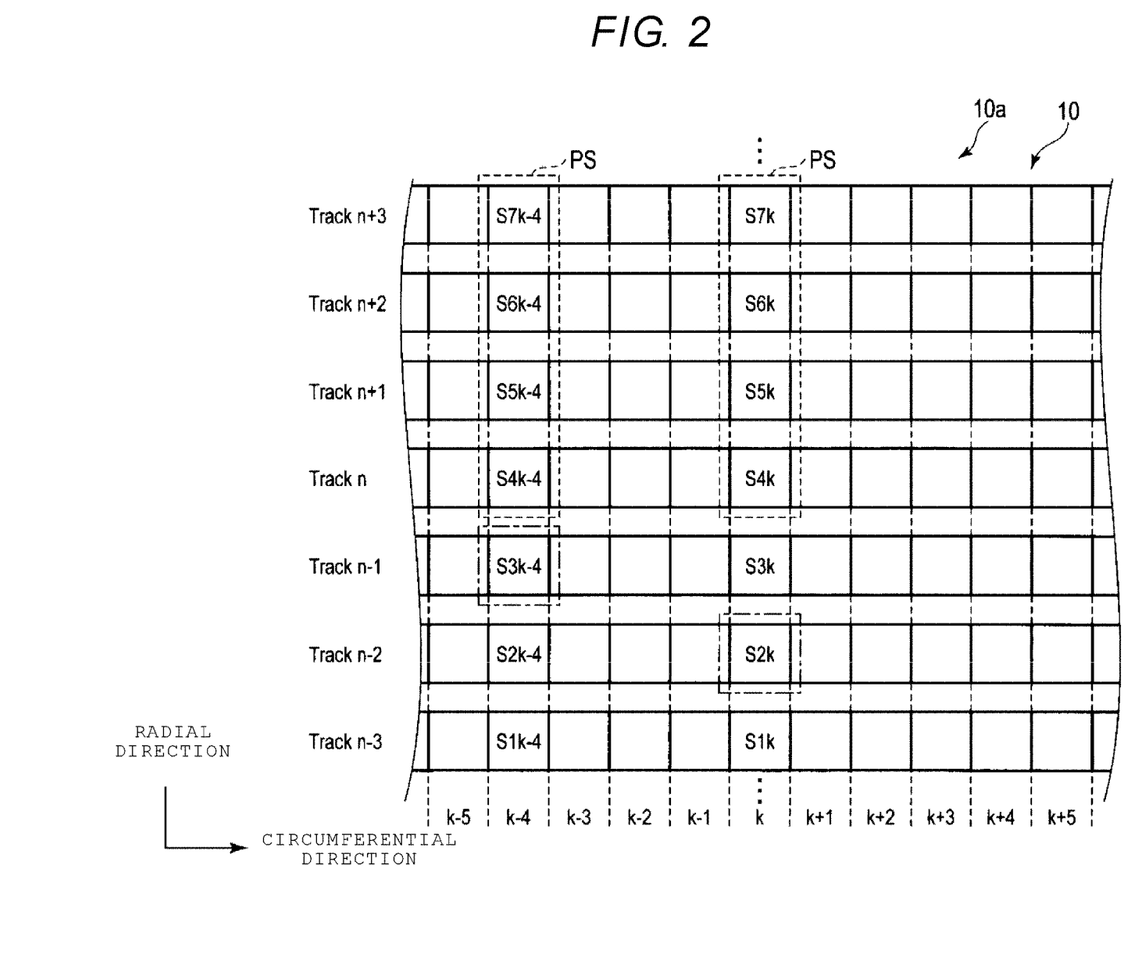
FIG. 2 is a diagram illustrating an example of a method of detecting an extended defective sector according to the embodiment.

FIG. 2 is a diagram illustrating an example of a method of detecting an extended defective sector according to the embodiment. In FIG. 2, Track n−3, Track n−2, Track n−1, Track n, Track n+1, Track n+2, and Track n+3 of the user data area 10a are illustrated. In FIG. 2, sector numbers k−5, k−4, k−3, k−2, k−1, k, k+1, k+2, k+3, k+4, and k+5 are respectively given to sectors aligned in the circumferential direction. As shown, the sectors of sector numbers k−5 to k+5 are consecutively aligned in the circumferential direction in order of sector number. Thus, sectors of the same sector number are consecutively aligned in the radial direction. In the example illustrated in FIG. 2, Track n−3 includes sectors S1k−4 and 1k, Track n−2 includes sector S2k−4 and sector 2k, and Track n−3 includes sector S3k−4 and sector 3k. Track n includes sectors S4k−4 and 4k, Track n+1 includes sector S5k−4 and sector 5k, Track n+2 includes sector S6k−4 and sector 6k, and Track n+3 includes sector S7k−4 and sector 7k. The sectors S1k, S2k, S3k, S4k, S5k, S6k, and S7k are aligned in this order in the radial direction. The sectors S1k−4, S2k−4, S3k−4, S4k−4, S5k−4, S6k−4, and S7k−4 are also aligned in this order in the radial direction. In FIG. 2, for convenience of illustration and description, each track extends on a straight line, but in practice each track is curved to follow the shape of the disk 10 illustrated in FIG. 1. In the example illustrated in FIG. 2, P sectors PS include the sectors S4k to S7k and the sectors S4k−4 to S7k−4. In FIG. 2, the registration threshold value is 1.

When the target defective sector S2k is detected, the detection unit 64 then determines the extended defective sector S3k located between the sectors S4k to S7k, which are among the P sector PS registered in the P list PL, and the target defective sector S2k. Thus, the detection unit 64 detects the extended defective sector S3k based on information included in the P list PL and on the physical location of the target defective sector S2k. In addition, in some embodiments, the detection unit 64 then determines whether the number of the detected extended defective sector (s) (in this embodiment, 1) are equal to or less than a registration threshold value (in this embodiment, 1) or greater than the registration threshold value. When the detection unit 64 determines that the number of extended defective sectors (1) is equal to or less than the registration threshold value (1), the detection unit 64 registers the target defective sector S2k in the P list PL and the extended defective sector S3k in the G list GL, and replaces the defective sector S2k registered in the P list PL with a first alternative sector, and replaces the extended defective sector S3k registered in the G list GL with a second alternative sector.

When the target defective sector S3k−4 is detected, which is adjacent to the P sectors S4k−4 to S7k−4, the detection unit 64 registers the target defective sector S3k−4 in the P list PL and registers the extended defective sector S2k−4, which is adjacent to the target defective sector S3k−4 in the extending direction, to the G list GL, based on information in the P list PL and on the physical location of the target defective sector S3k−4. It is noted that the extending direction is indicated by a line formed by the P sectors S4k−4 to S7k−4. Thus, in the embodiment illustrated in FIG. 2, the extending direction is parallel to the radial direction. The detection unit 64 then replaces the target defective sector S3k−4 in the P list PL with a first alternative sector and the extended defective sector S2k−4 in the G list GL with a second alternative sector.

Figure 3:
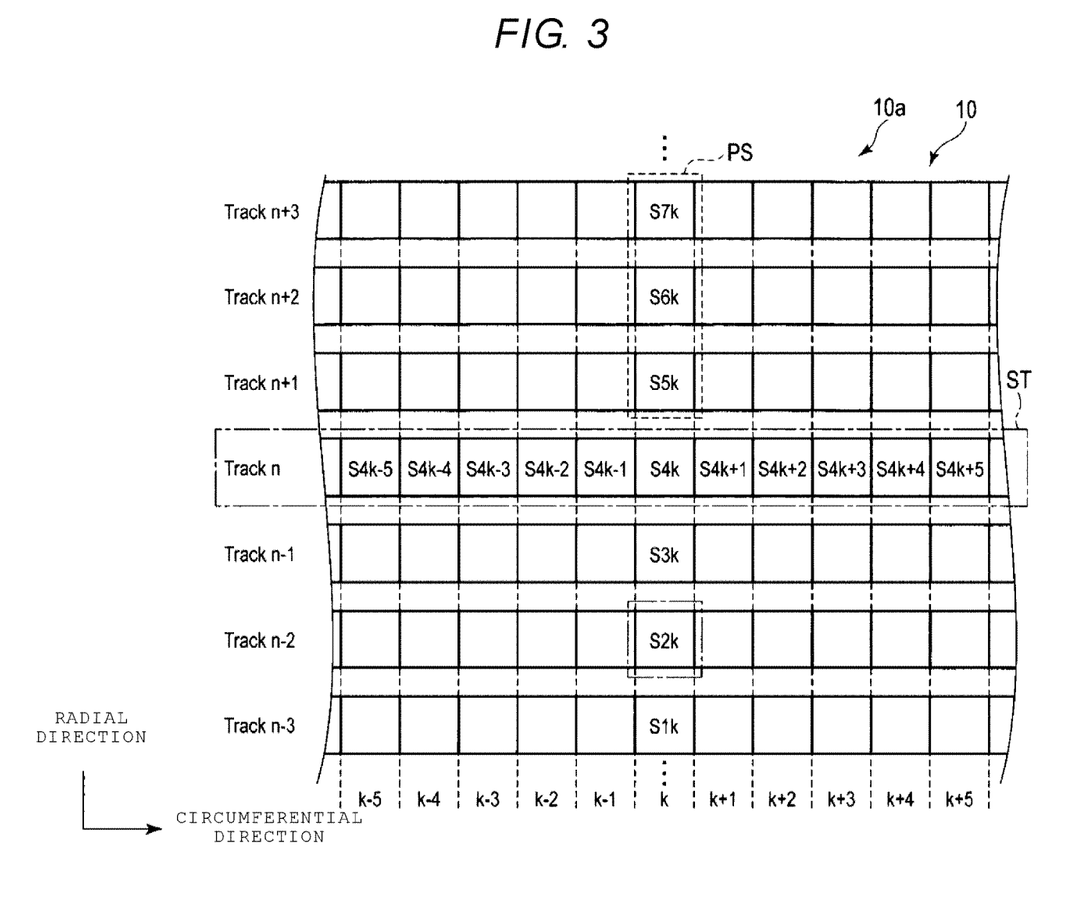
FIG. 3 is another diagram illustrating the example of the method of detecting the extended defective sector according to the embodiment.

FIG. 3 is a diagram illustrating another example of the method of detecting an extended defective sector according to the embodiment. In the example illustrated in FIG. 3, Track n includes a sector S4k−5, sector S4k−4, sector S4k−3, sector S4k−2, sector S4k−1, sector S4k, sector S4k+1, sector S4k+2, sector S4k+3, sector S4k+4, and sector S4k+5. The sectors S4k−5 to S4k+5 are aligned, as shown, in the circumferential direction. In the example illustrated in FIG. 3, the P sector PS includes the sectors S5k to S7k, the slip track ST includes Track n, and the registration threshold value is 1.

When the target defective sector S2k is detected, the detection unit 64 determines the extended defective sector S3k located between the track n (which is the slip track ST) and the target defective sector S2k, based on the track slip information TSI and the physical location of target defective sector S2k. The detection unit 64 determines whether the number of the detected extended defective sectors (in this embodiment, 1) is equal to or less than the registration threshold value (in this embodiment, 1) or greater than the registration threshold value. The detection unit 64 determines that the number of extended defective sectors (1) is equal to or less than the registration threshold value (1), then registers the target defective sector S2k in the P list PL and the extended defective sector S3k in the G list GL. In addition, the detection unit 64 replaces the defective sector S2k registered in the P list PL with a first alternative sector, and replaces and the extended defective sector S3k in the G list GL with a second alternative sector.

Figure 4:
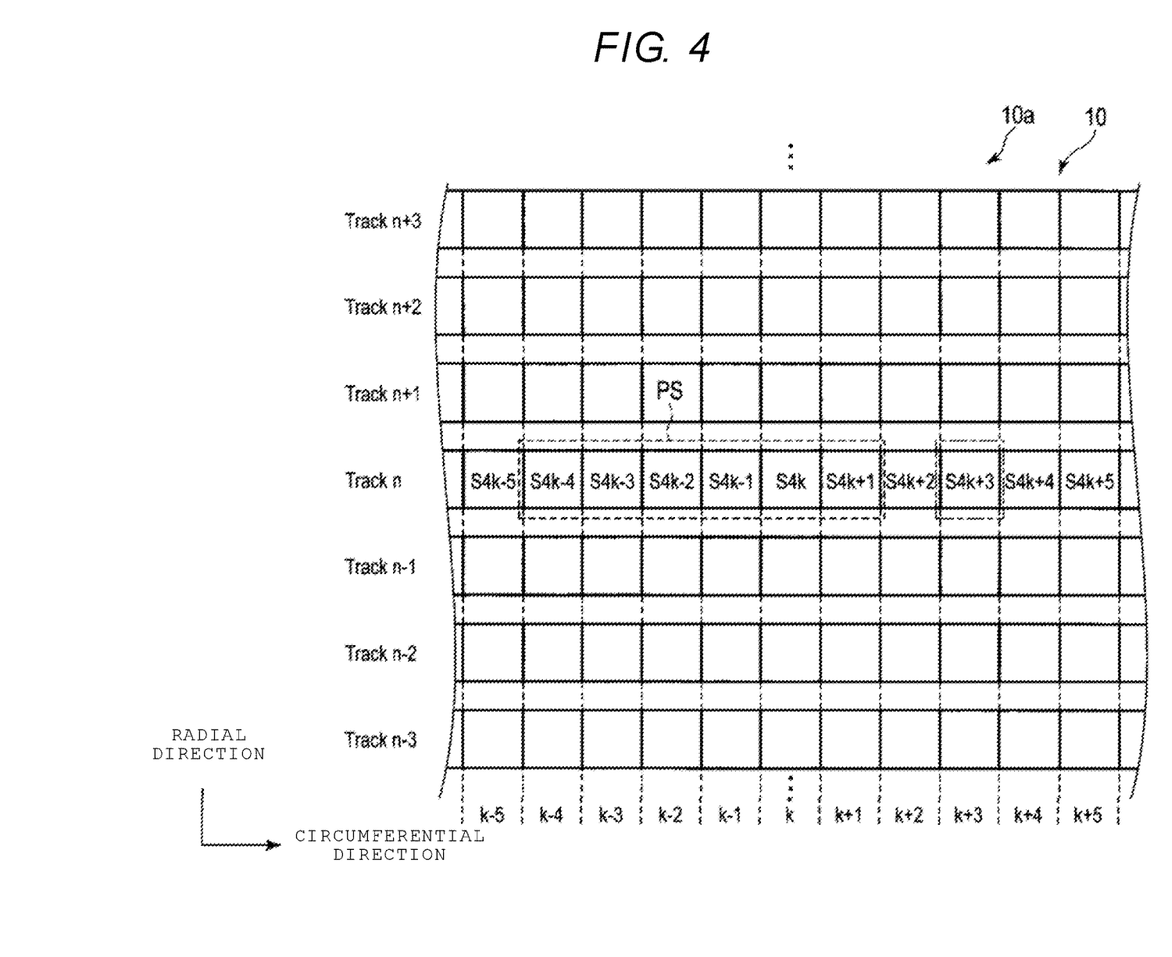
FIG. 4 is another diagram illustrating the example of the method of detecting the extended defective sector according to the embodiment.

FIG. 4 is a diagram illustrating another example of the method for detecting an extended defective sector according to embodiment. In the example illustrated in FIG. 4, the P sectors PS include sectors S4k−4 to S4k+1. In FIG. 4, the registration threshold value is 1. When the target defective sector S4k+3 is detected, the detection unit 64 determines the extended defective sector S4k+2 to be the extended defective sector, since extended defective sector S4k+2 is located between the sectors S4k−4 to S4k+1 (which are the P sectors PS) and the target defective sector S4k+3. The detection unit 64 makes such a determination based on information included in the P list PL and on the physical location of the target defective sector S4k+3. In addition, the detection unit 64 determines whether the number of the detected extended defective sectors (in this embodiment, 1) is equal to or less than the registration threshold value (in this embodiment, 1) or greater than the registration threshold value. The detection unit 64 determines that the number of extended defective sectors ((1) is equal to or less than the registration threshold value (1), and registers the target defective sector S4k+3 in the P list PL and the extended defective sector S4k+2 in the G list GL, and replaces the target defective sector S4k+3, which is registered in the P list PL with a first alternative sector and the extended defective sector S4k+2, which is registered in the G list GL with a second alternative sector. When a target defective sector adjacent to the sectors S4k−4 to S4 k+1 (which are the P sectors PS) in the radial direction is detected, the detection unit 64 registers the target defective sector in the P list PL. In addition, when the number of extended defect sectors is equal to or less than the registration threshold value, the detection unit 64 registers the extended defective sectors in the G list GL that are adjacent to the target defective sector in the extending direction from the target defective sector. The detection unit 64 accomplishes the above registrations of the target defective sector and extended defective sector(s) based on information included in the P list PL and on the physical location of the target defective sector. The detection unit 64 also replaces the target defective sector registered in the P list PL with an alternative sector, and replaces the extended defective sector registered in the G list GL (the number of which is equal to or less than the registration threshold value) with another alternative sector.

Figure 5:
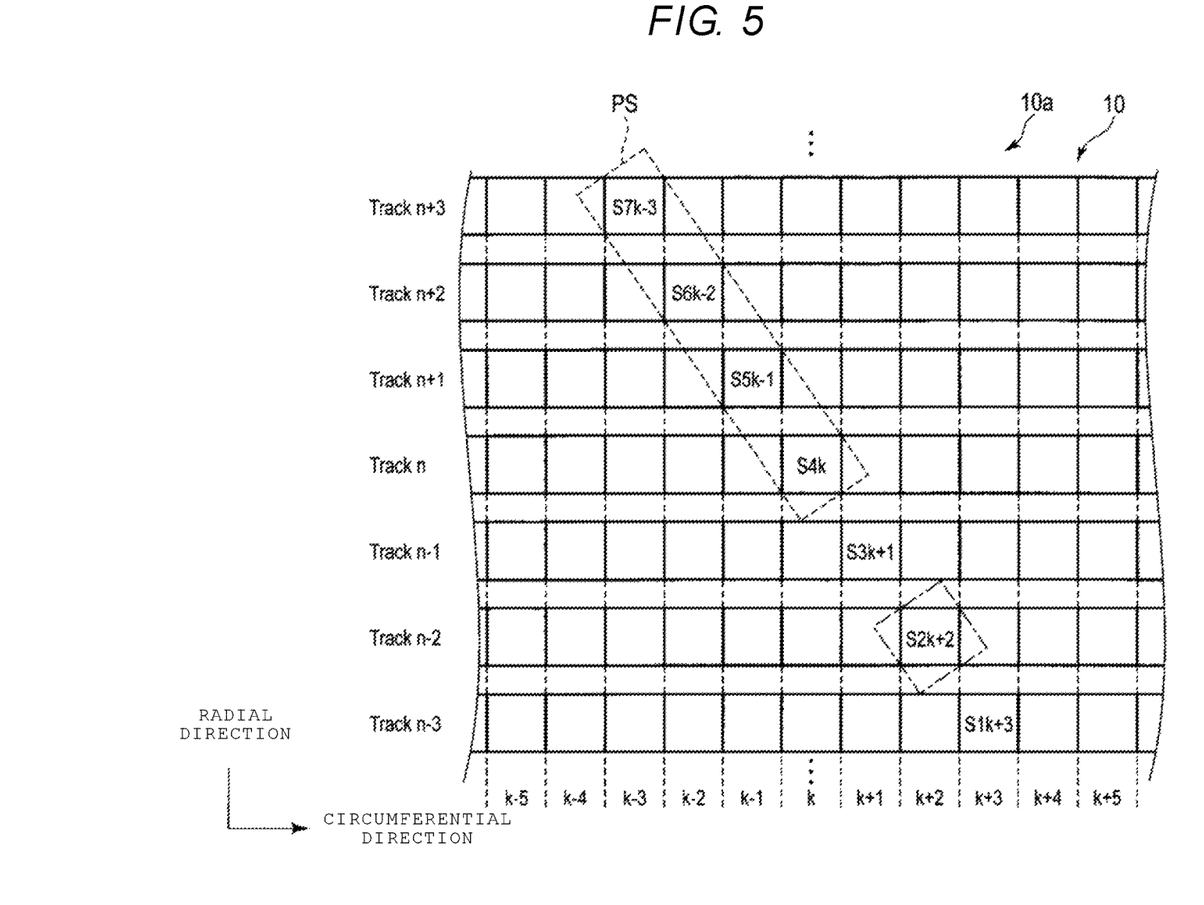
FIG. 5 is another diagram illustrating the example of the method of detecting the extended defective sector according to the embodiment.

FIG. 5 is a diagram illustrating another example of the method of detecting the extended defective sector according to the embodiment. In the example illustrated in FIG. 5, Track n−3 includes a sector S1$k$+3, Track n−2 includes a sector S2$k$+2, and Track n−1 includes a sector S3$k$+1. Track n includes a sector S4$k$, Track n+1 includes a sector S5$k$−1, Track n+2 includes a sector S6$k$−2, and Trackn+3 includes a sector S7$k$−3. The sector S1$k$+3, sector S2$k$+2, sector S3$k$+1, sector S4$k$, sector S5$k$−1, sector S6$k$−2, and sector S7$k$−3 are aligned in a direction (hereinafter referred to as an oblique direction) that crosses and is not parallel with the radial direction and the circumferential direction. In the example illustrated in FIG. 5, the P sectors PS include the sector S4$k$, the sector S5$k$-1, the sector S6$k$-2, and the sector S7$k$-3, and the registration threshold value is 1.

When the target defective sector S2$k$+2 is detected, the detection unit 64 determines that the extended defective sector S3$k$+1, which is located between the sector S4$k$ (and the other the P sectors PS, including the sector S5$k$−1, the sector S6$k$−2, and the sector S7$k$−3) and the target defective sector S2$k$+2, is an extended defective sector. Detection unit 64 makes the determination based on information included in the P list PL and on the physical location of target defective sector S2$k$+2. Specifically, the detection unit 64 determines whether the number of the detected extended defective sectors (in this case, 1) is equal to or less than the registration threshold value (in this case, 1) or greater than the registration threshold value. When the detection unit 64 determines that the number of the extended defective sectors is equal to or less than the registration threshold value, the detection unit 64 registers the target defective sector S2$k$+2 and the extended defective sector S3$k$+1 in the P list PL and the G list GL, respectively. The detection unity 64 also replaces each of the target defective sector S2$k$+2 and the extended defective sector S3$k$+1, which are respectively registered in the P list PL and G list GL with a respective alternative sector. When the target defective sector S2$k$+2 is detected in an instance in which Track n is the slip track ST (see FIG. 3), the detection unit 64 determines that the extended defective sector S3$k$+1 located between Track n and the target defective sector S2$k$+2 is an extended defective sector, based on the track slip information TSI and the physical location of target defective sector S2$k$. In an instance in which a target defective sector is adjacent to a contiguous group of P sectors (e.g., the sector S4$k$, the sector S5$k$−1, the sector S6$k$−2, and the sector S7$k$−3, which are the P sector PS aligned in an oblique direction), the detection unit 64, based on information in the P list PL and on the physical location of the target defective sector (e.g., target defective sector S2$k$+2), registers the target defective sector in the P list PL. In addition, the detection unit 64 also registers the extended defective sectors (of which the number is equal to or less than the registration threshold value and which are adjacent to the target defective sector in the extending direction from the target defective sector) in the G list GL. For example, in FIG. 5, the extending direction is parallel an oblique direction that is parallel to a line that includes the physical locations of the contiguous group of P sectors (e.g., the sector S4$k$, the sector S5$k$−1, the sector S6$k$−2, and the sector S7$k$−3). Further, the detection unit 65 replaces target defective sector registered in the P list PL with an alternative sector and each of the extended defective sectors (the number of which is equal to or less than the registration threshold value), registered in the G list GL with a respective alternative sector.

Figure 6:
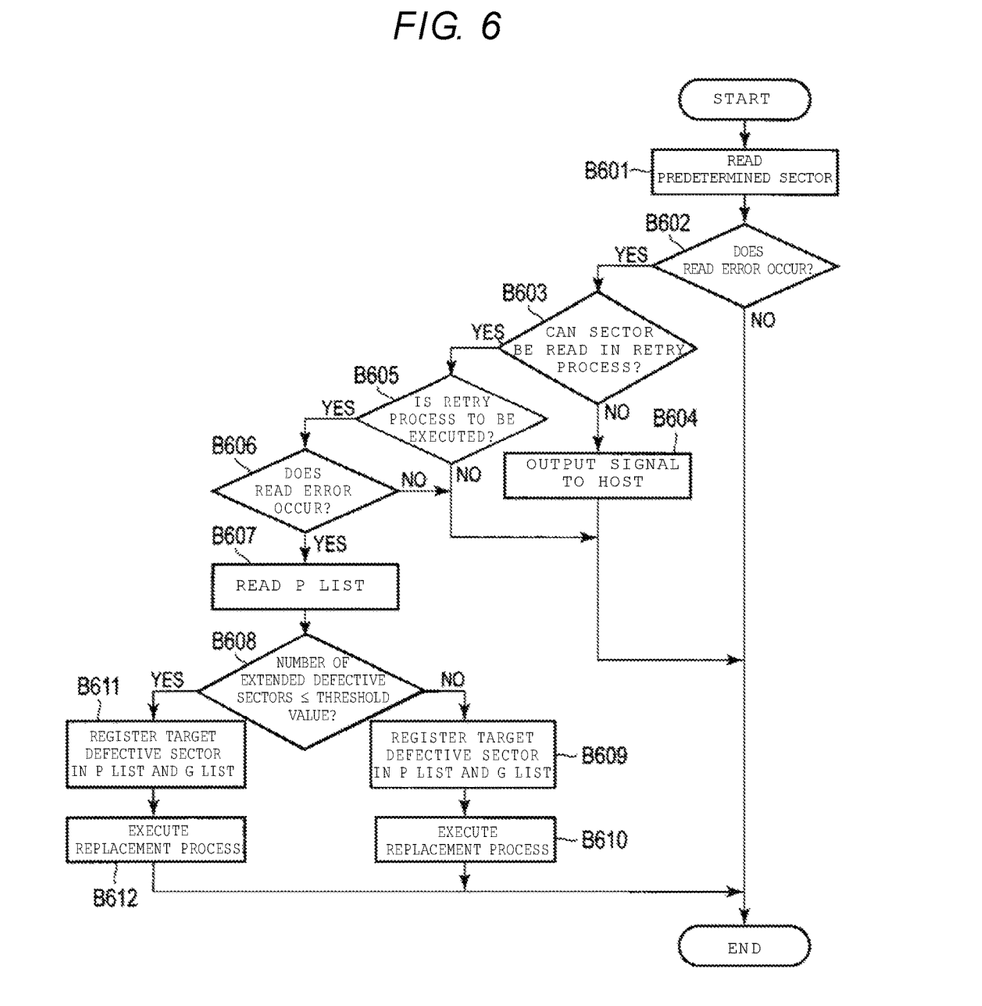
FIG. 6 is a flowchart illustrating an example of a read processing method according to the embodiment.

FIG. 6 is a flowchart illustrating an example of a read processing method according to the embodiment. The MPU 60, based on the G list GL, reads a predetermined sector (B601) and determines whether a read error occurs in the predetermined sector (B602). When it is determined that a read error has not occurred (NO in B602), the MPU 60 ends the process. When it is determined that a read error has occurred (YES in B602), the MPU 60 determines whether the predetermined sector can be read by a retry process performed a number of times less than a retry threshold value or cannot be read even if the retry process is performed a number of times equal to or greater than the retry threshold value (B603). When it is determined that the predetermined sector cannot be read even if the retry process is performed a number of times equal to or greater than the retry threshold value (NO in B603), the MPU 60 outputs a signal indicating that the read error will occur even if the retry process is performed a number of times equal to or greater than the retry threshold value (B 604) to the host 100, and ends the process. When it is determined that the predetermined sector can be read by a retry process a number of times less than the retry threshold value, the MPU 60 determines whether or not the rewrite process is to be executed on the predetermined sector (B605). For example, when it is determined that data written in the predetermined sector can be read by a retry process a number of times less than the retry threshold value, the MPU 60 executes the verify process on the predetermined sector and determines whether data written in the predetermined sector can be normally read or not. When it is determined that the rewrite process is not to be executed (NO in B605), the MPU 60 ends the process. For example, when it is determined that data of the predetermined sector is successfully read by the verify process, the MPU 60 ends the process. When it is determined that the rewrite process is to be executed (YES in B605), the MPU 60 again determines whether or not a read error occurs in the predetermined sector on which the rewrite process is executed (B606). For example, when it is determined that data associated with the predetermined sector cannot be normally read, the MPU 60 recovers the data of the sector, executes the rewrite process on the track including the sector where the data was recovered, and again determines whether or not a read error occurs in the sector after the rewrite process is executed.

When it is determined that the read error has not occurred (NO in B606), the MPU 60 ends the process. When it is determined that a read error occurs (YES in B606), the sector in which the read error occurs is detected by the detection unit 64 to be a target defective sector. Thus, in response, the MPU 60 reads the P list PL and the track slip information TSI, and the like (B607), and determines whether the number of extended defective sectors is greater than the registration threshold value or not (B608). For example, the MPU 60 detects an extended defective sector located between a sector in which a read error occurs (the target defective sector) and a P sector or slip track, and determines whether the number of the detected extended defective sectors is equal to or less than the registration threshold value or greater than the registration threshold value. When at least one extended defective sector that is adjacent to the target defective sector in the extending direction is detected, the MPU 60 registers the extended defective sectors (of which the number is equal to or less than the threshold value), and proceeds to the process in B611. When it is determined that the number of extended defective sectors is greater than the registration threshold value (NO in B608), the MPU 60 registers the target defective sector in each of the P list PL and the G list GL (B609), replaces the target defective sector registered in the P list PL and the G list GL with an alternative sector (B610), nd ends the process. When it is determined that the number of extended defective sectors is equal to or less than the registration threshold value (YES in B608), the MPU 60 registers the target defective sector in the P list PL and the extended defective sector (s) in the G list GL (B611), replaces the target defective sector registered in the P list PL with a first alternative sector and the extended defective sector(s) registered in the G list GL with a respective alternative sector (B612), and ends the process.

According to the embodiment, the magnetic disk device detects the target defective sector and the extended defective sector(s) located in the extending direction from the target defective sector, registers the target defective sector and the extended defective sector in the G list GL and the P list PL, respectively, and replaces the target defective sector and the extended defective sector(s) with respective alternative sectors. For example, when the extended defective sector is located between a P sector and the target defective sector, the magnetic disk device 1 determines whether the number of detected extended defective sectors is equal to or less than the registration threshold value or greater than the registration threshold value. When it is determined that the number of extended defective sectors is equal to or less than the registered threshold value, the detection unit 64 registers the target defective sector and the extended defective sector in the P list PL and the G list GL, respectively, and replaces the target defective sector and the extended defective sector(s) with respective alternative sectors. When the target defective sector is adjacent to the P sector, the detection unit 64 registers the target defective sector in the P list PL and the extended defective sectors in the G list GL, where the number of extended defective sectors is equal to or less than the registration threshold value and where the extended defective sector(s) are adjacent to the target defective sector in the extending direction The detection unit then replaces each of the target defective sector and the extended defective sector(s) so registered with respective alternative sectors. Thus, the magnetic disk device determines the sectors which are likely to later become a defective sector, registers the sectors so determined in the G list GL, and replaces the sectors so determined with the respective alternative sectors. The magnetic disk device 1 proactively registers the sectors that can subsequently become defective sectors in the G list so as to make it possible to prevent frequent occurrence of the retry process. In this way, the magnetic disk device 1 can prevent degraded read performance.

Next, a magnetic disk device according to a modified embodiment will be described. In the modified embodiment, the same reference numerals are given to the elements that are the same as those of the embodiment described above, and a detailed description thereof will be omitted.

Modified Embodiment

In the magnetic disk device 1 of the modified embodiment, a process of registering a target defective sector in the G list is different from the embodiment described above.

Specifically, when a target defective sector is detected, the detection unit 64 registers the target defective sector in the G list, and replaces the target defective sector (hereinafter, referred to as a target G sector) registered in the G list with an alternative sector. The detection unit 64 reads the P list PL, the track slip information TSI, the G list GL, and the like and detects the extended defective sector based on information included in the P list PL, the track slip information TSI, and the physical location of the target G sector. For example, the detection unit 64 determines that the sector(s) located between the P sector or slip track and the target G sector are the extended defective sector (s), based on information included in the P list PL, the track slip information TSI, and the G list GL. When the target G sector is adjacent to the P sector or a slip track, the detection unit 64 determines that the sector adjacent to the target G sector in the extending direction is an extended defective sector, based on information included in the P list PL, the track slip information TSI, and the location of the target G sector.

For example, in an instance in which the extended defective sector is located between the P sector and the target G sector, the detection unit 64 determines whether the number of the detected extended defective sectors is equal to or less than the registration threshold value or greater than the registration threshold value. When it is determined that the number of extended defective sectors is equal to or less than the registration threshold, the detection unit 64 registers the extended defective sector(s) in each of the P list PL and the G list GL, and registers the target G sector in the P list PL. In this case, the detection unit 64 replaces the extended defective sector and the target G sector with respective alternative sectors. When it is determined that the number of extended defective sectors is greater than the registration threshold value, the detection unit 64 registers the target G sector in the P list PL without registering the extended defective sector(s) in the P list PL or the G list GL. In this case, the detection unit 64 replaces the target G sector registered in the P list PL with an alternative sector. When the target G sector is adjacent to the P sector, the detection unit 64 registers the target G sector in the P list PL and registers the extended defective sector (s), which are adjacent to the target G sector in the extending direction and which are in number equal to or less than the registration threshold value and, in the P list PL and the G list GL. In this case, the detection unit 64 replaces the target G sector (which is registered in the P list PL) and the extended defective sectors with respective alternative sectors, and replaces the extended defective sectors (which are registered in the G list GL) with respective predetermined alternative sectors.

Figure 7:
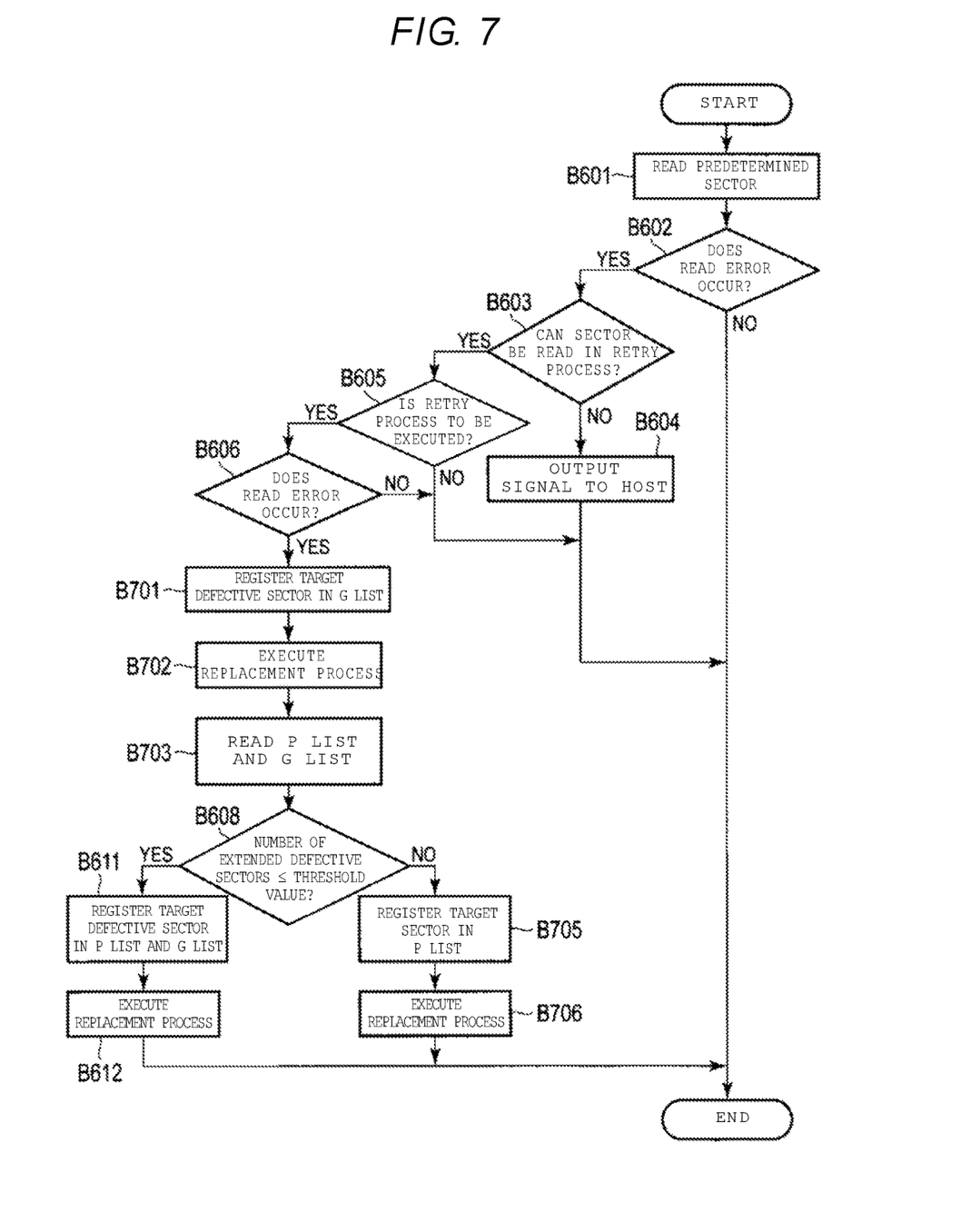
FIG. 7 is a flowchart illustrating an example of a read processing method according to a modification example.

FIG. 7 is a flowchart illustrating an example of a read processing method according to the modified embodiment.

The MPU 60 executes the processes of B601 to B606, registers a sector (target defective sector) in which a read error occurs after the rewrite process in the G list GL (B701), and replaces the target defective sector (target G sector) registered in the G list GL with an alternative sector (B702). The MPU 60 reads the P list PL, the G list GL, the track slip information TSI, and the like (B703) and determines whether or not the number of extended defective sectors is greater than the registration threshold value or equal to or less than the registration threshold value (B608). When it is determined that the number of extended defective sectors is greater than the registration threshold (NO in B608), the MPU 60 registers the target G sector in the P list PL (B705), replaces the target G sector registered in the P list PL with the alternative sector (B706), and ends the process.

According to the modified embodiment, the magnetic disk device 1 detects the target G sector and the extended defective sector(s) located in the extending direction of the target G sector, registers the target G sector and the extended defective sector in the G list GL and the P list PL, respectively, and replaces the target G sector and the extended defective sector registered in the G list GL and the P list PL with respective alternative sectors. For that reason, the magnetic disk device 1 can prevent deterioration of read performance.

The configurations of the embodiment and modified embodiments described above are applicable not only to the magnetic disk device 1 of a normal recording arrangement method but also to a shingled write magnetic recording (SMR) arrangement method in which a portion of the current track is overlaid on the adjacent track written one time before.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk that includes a plurality of tracks, each track including a plurality of sectors for storing data;
   a head that writes data to and reads data from the plurality of sectors; and
   a controller that is configured to
      determine that a first sector of the plurality of sectors is not able to be read and is a defective sector;
      determine that a second sector of the plurality of sectors is disposed along a line that extends through the first sector and a defective sector included in a first list of defective sectors;
      register the second sector in the first list of defective sectors; and
      reallocate an address corresponding to the second sector to a first alternative sector included on the disk.

2. The magnetic disk device according to claim 1, wherein the second sector is located between the first sector and the defective sector included in the first list of defective sectors.

3. The magnetic disk device according to claim 1, wherein the first list of defective sectors comprises a list of initial defective sectors.

4. The magnetic disk device according to claim 3, wherein the controller is further configured to register the second sector in a second list of defective sectors that includes sectors that have been determined to be readable and then subsequently determined to be unreadable.

5. The magnetic disk device according to claim 1, wherein the controller is further configured to determine that the first sector of the plurality of sectors is not able to be read by determining, after performing a rewrite process on the first sector, that a read error has occurred in the first sector.

6. The magnetic disk device according to claim 1, wherein the controller is further configured to, prior to registering the second sector in the first list of defective sectors, determine that a number of extended defective sectors disposed between the first sector and the defective sector is equal to or less than a threshold value.

7. The magnetic disk device according to claim 6, wherein the controller is further configured to determine the number of extended defective sectors disposed between the first sector and the defective sector based on information included in the first list of defective sectors and a physical location of the first sector.

8. The magnetic disk device according to claim 1, wherein the first sector is located between the second sector and the defective sector included in the first list of defective sectors.

9. The magnetic disk device according to claim 1, wherein the controller is further configured to register the first sector in the first list of defective sectors.

10. The magnetic disk device according to claim 9, wherein the controller is further configured to register the first sector in a second list of defective sectors that includes sectors that have been determined to be readable and then subsequently determined to be unreadable.

11. The magnetic disk device according to claim 10, wherein the controller is further configured to reallocate an address corresponding to the first sector from a second alternative sector included on the disk.

12. The magnetic disk device according to claim 1, wherein the first list of defective sectors comprises sectors that have been determined to be readable and then subsequently determined to be unreadable.

13. A magnetic disk device comprising:
    a disk that includes a plurality of tracks, each track including a plurality of sectors for storing data;
    a head that writes data to and reads data from the plurality of sectors; and
    a controller that is configured to
       determine that a first sector disposed on a slip track of the disk is not able to be read and is a defective sector;
       determine that a second sector of the plurality of sectors is disposed along a line that extends through the first sector and a defective sector included in a first list of defective sectors and;
       register the second sector in the first list of defective sectors; and
       reallocate an address corresponding to the second sector to an alternative sector included on the disk.

14. A method of reading data in a magnetic disk device that includes a disk having a plurality of sectors for storing data, the method comprising:
    determining that a first sector of the plurality of sectors is not able to be read and is a defective sector;
    determining that a second sector of the plurality of sectors is disposed along a line that extends through the first sector and a defective sector included in a first list of defective sectors;
    registering the second sector in the first list of defective sectors; and
    reallocating an address corresponding to the second sector from a first alternative sector included on the disk.

15. The method of claim 14, wherein the first list of defective sectors comprises a list of initial defective sectors.

16. The method of claim 15, further comprising:
    registering the second sector in a second list of defective sectors that includes sectors that have been determined to be readable and then subsequently determined to be unreadable.

17. The method according to claim 14, further comprising:
- determining that the first sector of the plurality of sectors is not able to be read by determining, after performing a rewrite process on the first sector, that a read error has occurred in the first sector.

18. The method according to claim 14, further comprising:
- prior to registering the second sector in the first list of defective sectors, determining that a number of extended defective sectors disposed between the first sector and the defective sector is equal to or less than a threshold value.

19. The method according to claim 18, further comprising:
- determining the number of extended defective sectors disposed between the first sector and the defective sector based on information included in the first list of defective sectors and a physical location of the first sector.

20. The method according to claim 14,
- wherein the first sector is located between the second sector and the defective sector included in the first list of defective sectors.

* * * * *